US012434494B2

(12) United States Patent
Kearney et al.

(10) Patent No.: US 12,434,494 B2
(45) Date of Patent: Oct. 7, 2025

(54) DUAL MODE LABEL PRINTER

(71) Applicant: Hand Held Products, Inc., Charlotte, NC (US)

(72) Inventors: Sean P. Kearney, Marlton, NJ (US); Christopher T. Wiencek, Moorestown, NJ (US); Yang Zhang, Berwyn, PA (US); David E. Chaney, Charlotte, NC (US); Ramanathan Alaganchetty, Singapore (SG); Yongxing Shu, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 204 days.

(21) Appl. No.: 18/315,690

(22) Filed: May 11, 2023

(65) Prior Publication Data

US 2024/0375419 A1 Nov. 14, 2024

(51) Int. Cl.
*B41J 3/407* (2006.01)
*B41J 11/70* (2006.01)

(52) U.S. Cl.
CPC ........... *B41J 11/703* (2013.01); *B41J 3/4075* (2013.01)

(58) Field of Classification Search
CPC ........ B41J 3/4075; B41J 11/703; B41J 13/00; B41J 15/00; B41J 15/16; B41J 15/165; B65C 11/02; B65C 2009/0093
See application file for complete search history.

(56) References Cited

U.S. PATENT DOCUMENTS

| | | | |
|---|---|---|---|
| 7,510,343 | B1 | 3/2009 | Arrington et al. |
| 7,883,283 | B2 | 2/2011 | Oshida et al. |
| 9,248,672 | B2 | 2/2016 | Sago et al. |
| 9,434,191 | B2 | 9/2016 | Preliasco et al. |
| 9,908,345 | B2 | 3/2018 | Beck et al. |
| 10,189,285 | B2 | 1/2019 | Wong et al. |
| 11,001,084 | B2 | 5/2021 | Preliasco et al. |
| 11,254,144 | B2 | 2/2022 | Kobayashi et al. |
| 11,458,647 | B2 | 10/2022 | Mizutani |
| 2013/0108346 | A1 * | 5/2013 | Preliasco ............... B41J 3/4075 400/611 |
| 2018/0304649 | A1 | 10/2018 | Wong et al. |
| 2022/0176719 | A1 | 6/2022 | Mizutani |
| 2022/0203724 | A1 | 6/2022 | Kato et al. |

FOREIGN PATENT DOCUMENTS

| | | | |
|---|---|---|---|
| JP | 2007-083639 | A | 4/2007 |
| JP | 2014-061647 | A | 4/2014 |
| JP | 6068023 | B2 | 1/2017 |

OTHER PUBLICATIONS

Extended European Search Report Mailed on Aug. 16, 2024 for EP Application No. 24170451, 9 page(s).

* cited by examiner

*Primary Examiner* — Kristal Feggins
(74) *Attorney, Agent, or Firm* — Alston & Bird LLP

(57) ABSTRACT

A printer that includes a presenter bar, a first tear bar positioned proximate to the presenter bar, and a second tear bar that is configured to move from a first position to a second position is provided. The first position is closer to the first tear bar than the second position.

20 Claims, 3 Drawing Sheets

DUAL MODE LABEL PRINTER

TECHNICAL FIELD

The present application relates generally to a printer. More specifically, the present application relates generally to a dual mode label printer.

BACKGROUND

Printers, such as label printers, are used in a variety of industries, including retail, logistics, and healthcare. These devices allow users to print labels that include a face that can be adhered to a backing of the label. The face of the label may include information, such as bar codes, quick response (QR) codes, serial numbers, etc.

In some instances, the user of the printer may desire to tear a printed label from the printer with the backing still on to, for example, hand to a customer or place within a box. The user may also desire to have the option to tear the printed label by pulling the label toward them or away from them. Yet in other instances, the user of the printer may desire to have the printer remove the label from its backing to, for example, adhere the label to a package. However, existing technologies in this field do not allow for printers that operate in a first mode where the label can be torn by pulling the label either toward or away from the user and in a second mode where the label is removed from its backing by the printer.

The inventors have identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include methods and apparatuses to provide for improved printers. More specifically, embodiments of the present disclosure provided herein include methods and apparatuses to provide for a dual mode printer that can operate in a tear mode and in a peel mode.

In various aspects, a printer includes a presenter bar, a first tear bar positioned proximate to the presenter bar, and a second tear bar that is configured to move from a first position to a second position. The first position can be closer to the first tear bar than the second position.

In various examples, the second tear bar is coupled to or integral with the presenter bar.

In various examples, the second tear bar is configured to move from the first position to the second position when the presenter bar is rotated.

In various examples, the printer is configured to print labels. The first tear bar and the second tear bar can include an edge that is configured to tear the labels.

In various examples, the printer is configured to operate in a tear mode and in a peel mode. When the second tear bar is in the first position, the printer can be in the tear mode and when the second tear bar is in the second position, the printer can be in the peel mode.

In various examples, when the second tear bar is in the first position, the second tear bar is configured to extend towards a first path defined by a label to be discharged from the printer. When the second tear bar is in the second position, the second tear bar can be configured to extend away from the first path.

In various examples, the second tear bar is configured to rotate from the first position to the second position.

In various examples, the printer includes a pocket. The second tear bar can be configured to be positioned at least partially outside of the pocket when the second tear bar is in the first position. The second tear bar can be configured to be positioned completely within the pocket when the second tear bar is in the second position.

In various examples, the second tear bar is configured to translate from the first position to the second position.

In various aspects, a method of transitioning the printer of claim 1 from a tear mode to a peel mode, the method includes moving the second tear bar from the first position to the second position.

In various examples, the method includes rotating the presenter bar of the printer to move the second tear bar from the first position to the second position.

In various examples, moving the second tear bar includes rotating the second tear bar.

In various examples, the method includes rotating a knob of the printer to move the second tear bar from the first position to the second position.

In various examples, moving the second tear bar includes translating the second tear bar.

In various examples, the method includes moving a switch of the printer to move the second tear bar from the first position to the second position.

In various examples, the method includes moving the second tear bar from being positioned at least partially outside of a pocket of the printer to being positioned completely within the pocket.

In various aspects, a label printer configured to print one or more labels that each include a backing that a face of the label is adhered to. The label printer can be configured to operate in a tear mode and in a peel mode. The label printer can include a presenter bar configured to peel the backing from the face of the one or more labels when the label printer is in the peel mode, a first tear bar positioned proximate to the presenter bar configured to tear the one or more labels, and a second tear bar that is configured to tear the one or more labels when the label printer is in the tear mode. The second tear bar can be configured to move from a first position to a second position. The first position can be closer to the first tear bar than the second position. When the second tear bar is in the first position, the label printer can be in the tear mode. When the second tear bar is in the second position, the label printer can be in the peel mode.

In various examples, the second tear bar is coupled to or integral with the presenter bar.

In various examples, the second tear bar is configured to rotate from the first position to the second position.

In various examples, the second tear bar is configured to translate from the first position to the second position.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
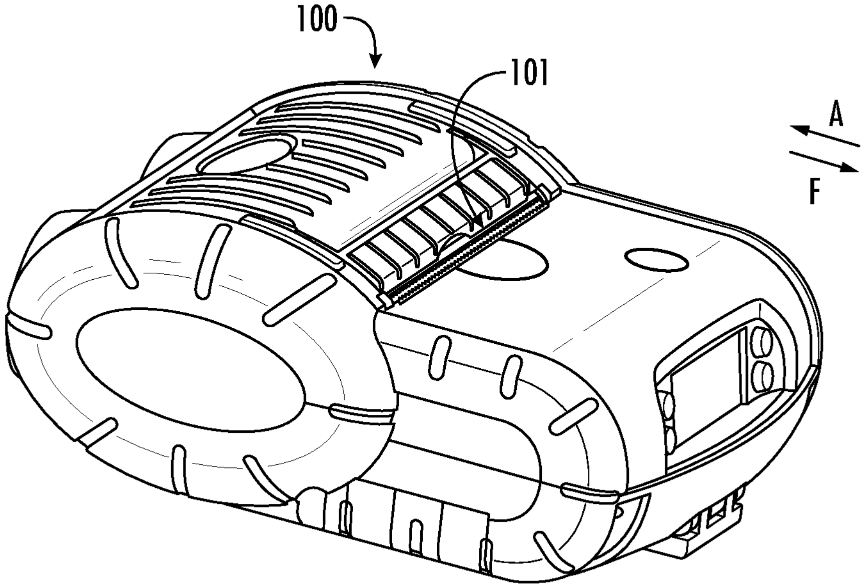

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of a printer, in accordance with an example embodiment.

Figure 2:
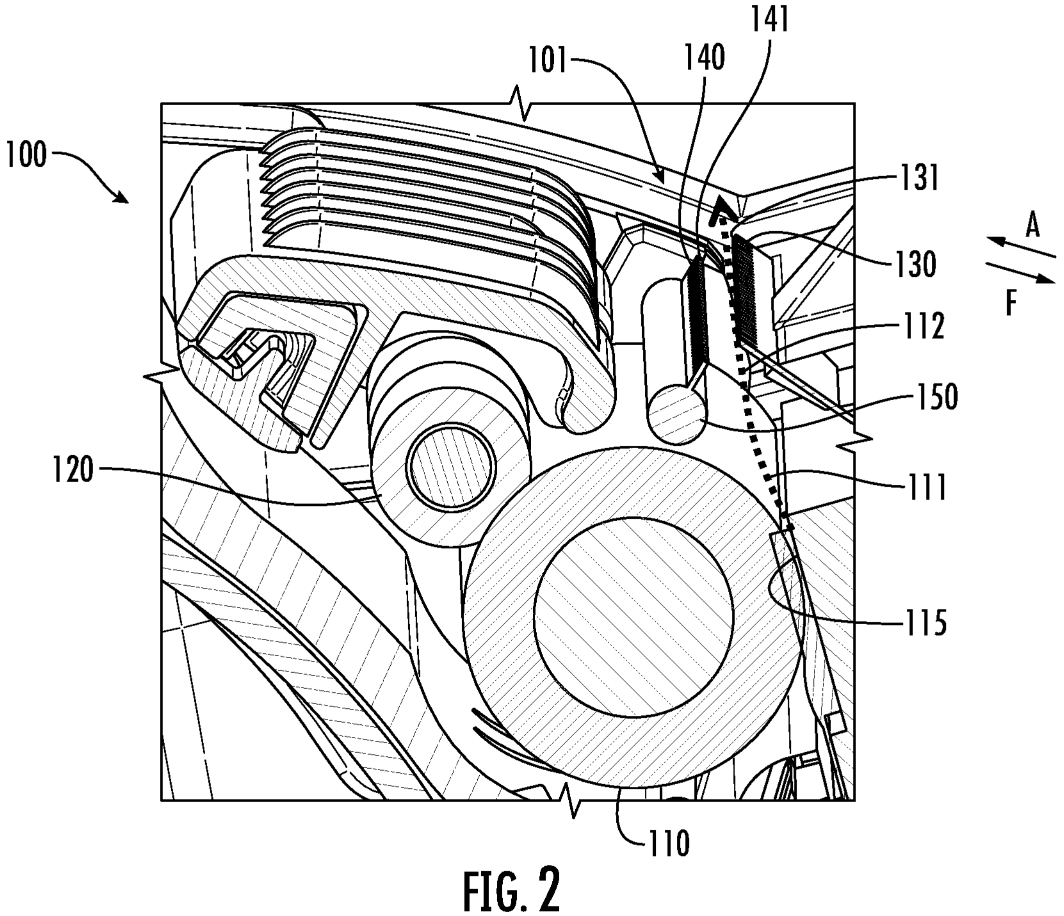

FIG. 2 provides a cross-sectional view of a portion of the printer of FIG. 1 in a tear mode, in accordance with an example embodiment.

Figure 3:
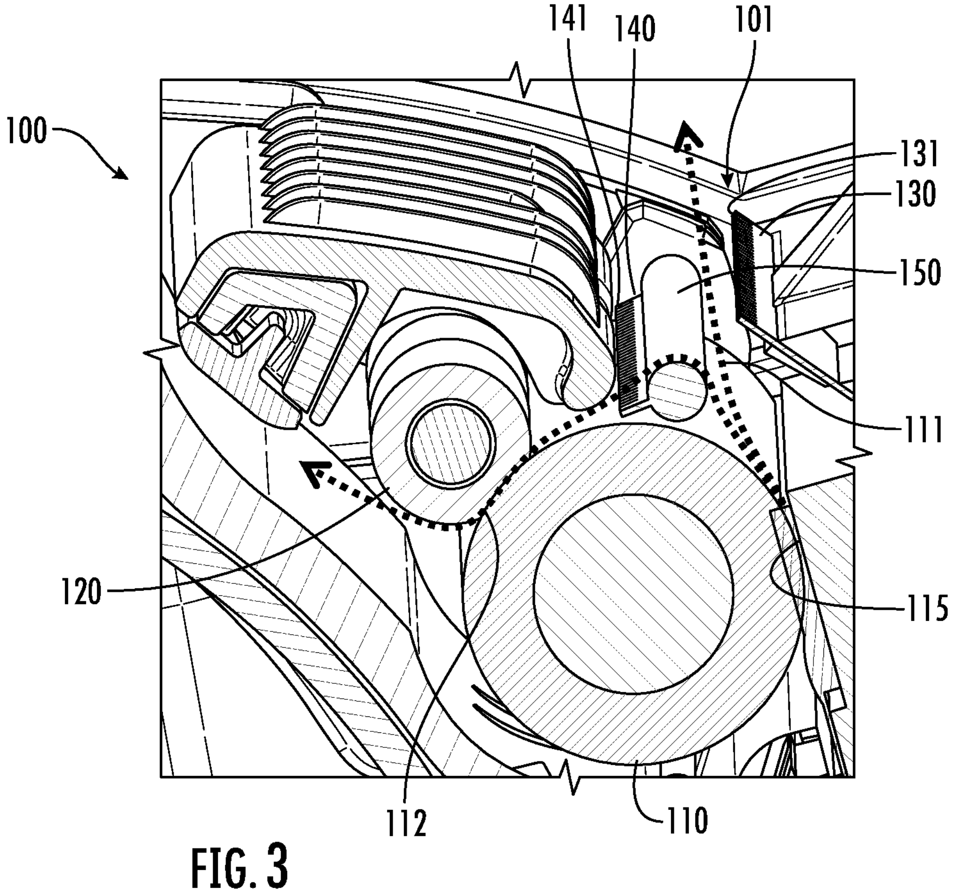

FIG. 3 provides a cross-sectional view of a portion of the printer of FIG. 1 in a peel mode, in accordance with an example embodiment.

Figure 4:
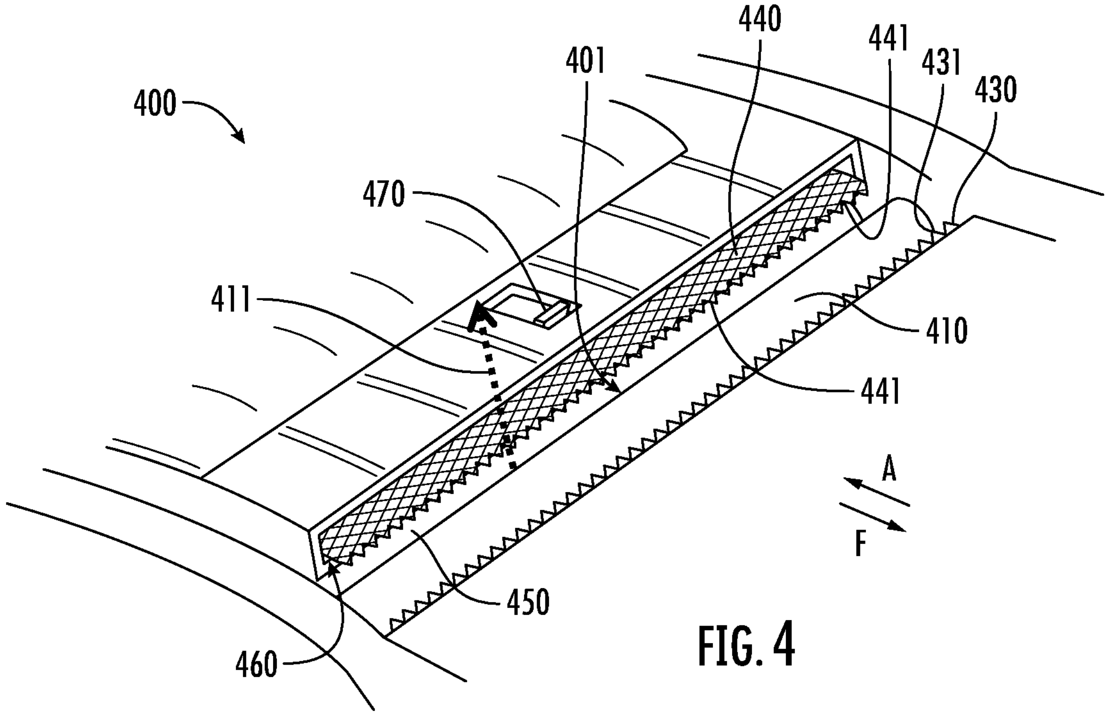

FIG. 4 provides a cross-sectional view of a portion of a printer in a tear mode, in accordance with an example embodiment.

Figure 5:
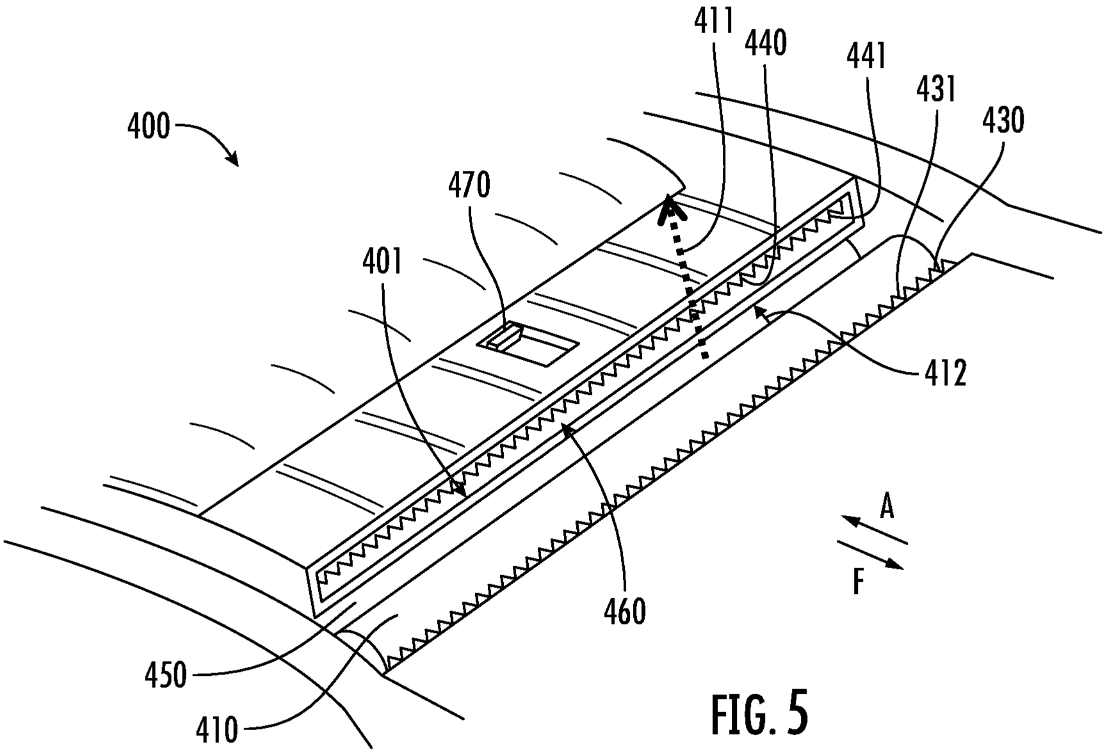

FIG. 5 provides a cross-sectional view of a portion of the printer of FIG. 4 in a peel mode, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term “exemplary” means serving as an example, instance, or illustration. Any aspect or design described herein as “exemplary” is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms “includes” and “including” and variants thereof are used in either the detailed description or the claims, these terms are intended to be inclusive in a manner similar to the term “comprising.”

As used herein, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

As used herein, the terms “coupled,” “fixed,” “attached to,” and the like refer to both direct coupling, fixing, or attaching, as well as indirect coupling, fixing, or attaching through one or more intermediate components or features, unless otherwise specified herein.

As used herein, the term “positioned directly on” refers to a first component being positioned on a second component such that they make contact. Similarly, as used herein, the term “positioned directly between” refers to a first component being positioned between a second component and a third component such that the first component makes contact with both the second component and the third component. In contrast, a first component that is “positioned between” a second component and a third component may or may not have contact with the second component and the third component. Additionally, a first component that is “positioned between” a second component and a third component is positioned such that there may be other intervening components between the second component and the third component other than the first component.

Referring now to FIG. 1, a perspective view of a printer 100 is provided, in accordance with an example embodiment. The printer 100 can define a forward direction F and an aft direction A. The printer 100 can be configured to print labels, such as labels that include barcodes or other information that is printed by the printer 100. The labels can be labels that include a backing, and the face of the label can be adhered to the backing of the label. The printer 100 can include an opening 101 for the labels to be discharged from.

In various examples, the printer 100 is configured as a portable printer, such as a portable thermal printer. When configured as a portable printer, the printer 100 may be worn by a user or may be coupled to equipment, such as a forklift or a lift truck. The printer 100 may also be set on a surface, such as the surface of a table.

As will be explained further, the printer 100 can be a dual mode printer. For example, the printer 100 can be configured to operate in a tear mode and in a peel mode. For example, the printer 100 can be configured to transition from the tear mode to the peel mode, and vice-versa. When the printer 100 is in the tear mode, the printer 100 can be configured to allow a user to tear the label by pulling on the label in either the forward direction F (e.g., towards the user) or the aft direction A (e.g., away from the user), which will be discussed in more detail. When the printer 100 is in the peel mode, the printer 100 can be configured to automatically peel one or more label from its backing and present the label to the user.

Referring now to FIG. 2, a cross-sectional view of a portion of the printer 100 of FIG. 1 in the tear mode is provided, in accordance with an example embodiment. The printer 100 can include a first drive component 110. The first drive component 110 can be configured to rotate. For example, an electric motor can be provided that can rotate the first drive component 110. The first drive component 110 can be configured to move one or more labels towards the opening 101 of the printer 100. For example, the label may be wedged between the first drive component 110 and a contact surface 115 to move the label towards the opening

101 of the printer 100. The path that the label makes as it is discharged from the opening 101 of the printer 100 may define a first path 111.

The printer 100 can include a first tear bar 130. The first tear bar 130 can include a tearing edge 131. For example, the tearing edge 131 can include serrations that facilitate the tearing of a label. The first tear bar 130 may be configured such that a user may pull a label that is positioned proximate to the opening 101 of the printer 100 in the forward direction F to tear the label. The first tear bar 130 can be firmly coupled to stationary components of the printer 100 such that it does not move in relation to the stationary components.

The printer 100 can include a second tear bar 140. The second tear bar 140 can include a tearing edge 141. For example, the tearing edge 141 can include serrations that facilitate the tearing of a label. For example, when the printer 100 is in the tear mode, a user may pull a label that is positioned proximate to the opening 101 of the printer 100 in the aft direction A to tear the label. As will be discussed further, the first tear bar 130 can be coupled to, or integral with, a movable component of the printer 100 such that it is allowed to move in relation to the stationary components of the printer 100.

Referring now to FIG. 3, a cross-sectional view of a portion of the printer 100 of FIG. 1 in the peel mode is provided, in accordance with an example embodiment. The printer 100 can include a peel mechanism 150. In various examples, and as depicted, the peel mechanism 150 includes a cylindrical-shaped body. However, the peel mechanism 150 can include a half-circle shaped body, a triangular-shaped body, etc., to name a few examples. The peel mechanism 150 may be configured to peel the backing from a label when the printer 100 is in the peel mode.

The printer 100 can include a second drive component 120. The second drive component 120 can be configured to rotate. For example, an electric motor can be provided that can rotate the second drive component 120. The second drive component 120 can be configured to move the backing of one or more labels away from the opening 101 of the printer 100. For example, the backing may be wedged between the first drive component 110 and the second drive component 120 to move the label away from the opening 101 of the printer 100 as the first drive component 110 and the second drive component 120 rotate.

The path that the backing takes through the portion of the printer 100 may define a second path 112. For example, and as depicted in FIG. 3, the backing and the label may be moved from between the first drive component 110 and the contact surface 115 and towards the opening 101 of the printer 100 by the rotation of the first drive component 110. The path that the backing takes through the printer 100, which is defined by the second path 112, may fork-off from the path that the label takes, which defines the first path 111, as it is discharged from the opening 101 of the printer 100. For example, the backing may extend partially around the peel mechanism 150, and towards and between the first drive component 110 and the second drive component 120. As such, the second path 112 defined by the backing may extend from between the first drive component 110 and the contact surface 115, towards and partially around the peel mechanism 150, and towards and between the first drive component 110 and the second drive component 120 when the printer 100 is in the peel mode.

As the backing extends partially around the peel mechanism 150, the label may peel off from the backing, which causes the label to be expelled from the opening 101 of the printer 100, via the first path 111, while the backing of the label continues along the second path 112, when the printer 100 is in the peel mode.

As briefly discussed, the printer 100 can be configured to operate in a tear mode (as depicted in FIG. 2) and in a peel mode (as depicted in FIG. 3). As also briefly discussed, the printer 100 can be configured to transition from the tear mode to the peel mode, and vice-versa. In various examples, and as depicted in FIGS. 2 and 3, the second tear bar 140 can be coupled to, or integral with, the peel mechanism 150. The peel mechanism 150 can be configured to rotate. For example, the peel mechanism 150 can be configured to rotate at least 90 degrees, such as at least 90 degrees and up to 180 degrees, such as approximately (e.g., within 5 degrees of) 90 degrees, 150 degrees, or 180 degrees. In various examples, a knob (not depicted) may be provided that allows a user to rotate the peel mechanism 150 and transition the printer 100 from the tear mode to the peel mode, and vice-versa. In various examples, a cam and lock (not depicted) may be provided that allows a user to rotate the peel mechanism 150 and transition the printer 100 from the tear mode to the peel mode, and vice-versa. In various examples, a lever (not depicted) is provided that allows a user to flip the peel mechanism 150 and transition the printer 100 from the tear mode to the peel mode, and vice-versa.

When the second tear bar 140 is coupled to, or integral with, the peel mechanism 150, the second tear bar 140 may also rotate at least 90 degrees, such as at least 90 degrees and up to 180 degrees. For example, the second tear bar 140 may be configured to move from a first position, as depicted in FIG. 2, to a second position, as depicted in FIG. 3. When the second tear bar 140 is in the first position (as depicted in FIG. 2), the second tear bar 140 may be positioned closer to the first tear bar 130 than when the second tear bar 140 is in the second position (as depicted in FIG. 3).

Notably, when the second tear bar 140 is in the second position, as depicted in FIG. 3, the second tear bar 140 does not intersect or interfere with the second path 112, which defines the path that the backing of the label takes through the portion of the printer 100. As such, when the second tear bar 140 is in the second position, the ability of the peel mechanism 150 to facilitate the peeling of the backing of the label is not hindered. Additionally, when the second tear bar 140 is in the second position, the second tear bar 140 extends away from the first path 111, which defines the path the label takes towards and out of the opening 101 of the printer 100. As such, the second tear bar 140, when in the second position, does not interfere with the label exiting the opening 101 of the printer 100.

Referring now to FIGS. 4 and 5, perspective views of a portion of a printer 400 are provided, in accordance with an example embodiment. More specifically, FIG. 4 provides a view of the printer 400 in a tear mode and FIG. 5 provides a view of the printer 400 in peel mode. The printer 400 can be configured similarly to the printer 100 as described in reference to FIG. 1-3. However, and as will be discussed further, the printer 400 of FIGS. 4 and 5 may include a second tear bar 440 that is not coupled to or integral with the peel mechanism 450.

Referring to FIG. 4, which depicts the printer 400 in the tear mode, the printer 400 can include a first drive component 410 that can be configured to rotate. The first drive component 410 can be configured to move one or more labels towards the opening 401 of the printer 400. For example, the label may be wedged between the first drive component 410 and a contact surface (not depicted in FIG. 4 or FIG. 5) to move the label towards the opening 401 of the printer 400. The path that the label makes as it is discharged from the opening 401 of the printer 400 may define a first path 411.

The printer 400 can include a first tear bar 430. The first tear bar 430 can include a tearing edge 431. The first tear bar 430 can be firmly coupled to stationary components of the printer 400 such that it does not move in relation to the stationary components.

The printer 400 can include a second tear bar 440. The second tear bar 440 can include a tearing edge 441. As will be discussed further, the second tear bar 440 can be coupled to, or integral with, a movable component of the printer 400 such that it is allowed to move in relation to the stationary components of the printer 400.

Referring to FIG. 5, which depicts the printer 400 in the peel mode, the printer 400 can include a peel mechanism 450. Like the printer 100, the printer 400 can include a second drive component (not depicted in FIG. 4 or FIG. 5) that may be configured to rotate. The second drive component can be configured to move the backing of one or more labels away from the opening 401 of the printer 400. For example, the backing may be wedged between the first drive component 410 and the second drive component to move the label away from the opening 401 of the printer 400 as the first drive component 410 and the second drive component rotate. The path that the backing takes through the portion of the printer 400 may define a second path 412 (partially depicted in FIG. 5). As the backing extends partially around the peel mechanism 450, the label may peel off from the backing, which causes the label to be expelled from the opening 401 of the printer 400, via the first path 411, while the backing of the label continues along the second path 412, when the printer 400 is in the peel mode.

As briefly discussed, the printer 400 can be configured to operate in a tear mode (as depicted in FIG. 4) and in a peel mode (as depicted in FIG. 5). As also briefly discussed, the printer 400 can be configured to transition from the tear mode to the peel mode, and vice-versa. In various examples, and as depicted in FIGS. 4 and 5, the second tear bar 440 can be configured to move from a first position to a second position, and vice-versa. For example, the second tear bar 440 can be configured to translate towards and away from the first tear bar 430. For example, the printer 400 can include a pocket 460. The pocket 460 may define a substantially cuboid-shaped space and can substantially house the second tear bar 440 when the printer 400 is in the peel mode. The printer 400 can include a switch 470 that is mechanically coupled to the second tear bar 440. The switch 470 can be configured to move the second tear bar 440 towards and away from the first tear bar 430 by, for example, a user of the printer 400. Moving the second tear bar 440 toward the first tear bar 430 (e.g., to the first position) positions at least a portion of the second tear bar 440 outside of the pocket 460 of the printer 400, as depicted in FIG. 4. For example, the tearing edge 441 of the second tear bar 440 may be completely outside of the pocket 460 of the printer 400, which may allow a user to use the second tear bar 440 to tear a label. Moving the second tear bar 440 away from the first tear bar 430 (e.g., to the second position) positions the second tear bar 440 completely or substantially within the pocket 460 of the printer 400, as depicted in FIG. 5.

The printer 100 and the printer 400 both have various benefits. For example, the printer 100, 400 can be configured to operate in both a tear mode and in a peel mode, which increased the usability of the printer 100, 400. For example, in some instances, the user of the printer 100, 400 may desire to tear a label from the printer 100, 400 with the backing still on to, for example, hand to a customer or place within a box. The user may also desire to have the option to tear the printed label by pulling the label toward them (e.g., in the forward direction F) or away from them (e.g., in the aft direction A). The printer 100, 400 of the present disclosure allows the user to tear the label from the printer 100, 400 by pulling the label towards them (e.g., towards the first tear bar 130) and by pulling the label away from them (e.g., towards the second tear bar 140) when the printer 100, 400 is in the tear mode, as depicted in FIGS. 2 and 4.

Yet in other instances, the user of the printer 100, 400 may desire to have the printer 100, 400 remove the label from its backing (e.g., remove the label from its backing automatically) to, for example, adhere the peeled label to a package. When the printer 100, 400 is in the peel mode, as depicted in FIGS. 3 and 5, the printer 100, 400 may peel the backing from the label via the peel mechanism 150. Notably, when the printer 100, 400 is in the peel mode, the second tear bar 140 is positioned away from where a hand of a user may be to grab the label, which may reduce the likelihood of injury from the second tear bar and may improve the safety of the printer 100, 400.

Existing printers may not allow for printers that operate in a first mode where the label can be torn by pulling the label either toward or away from the user and in a second mode where the label is removed from its backing by the printer. As such, the printer 100, 400 of the present disclosure has various benefits over existing printers.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A printer comprising:

a peel mechanism;

a first tear bar positioned proximate to the peel mechanism; and a second tear bar coupled to the peel mechanism, wherein a movement of the peel mechanism causes the second tear bar to move from a first position to a second position, wherein the second tear bar is configured to tear media in the first position along with the first tear bar and the peel mechanism is configured to peel the media when the second tear bar is in the second position, wherein the second tear bar is positioned proximal to the first tear bar when the second tear bar is in the first position, and wherein the second tear bar is distal from the first tear bar when the second tear bar is in the second position. wherein the first position is closer to the first tear bar than the second position.

2. The printer of claim 1, wherein the second tear bar is configured to move from the first position to the second position when the peel mechanism is rotated.

3. The printer of claim 1, wherein the media is labels, and wherein the printer is configured to print the labels, and wherein the first tear bar and the second tear bar comprise an edge that is configured to tear the labels.

4. The printer of claim 1, wherein the printer is configured to operate in a tear mode and in a peel mode, and wherein when the second tear bar is in the first position, the printer is in the tear mode and when the second tear bar is in the second position, the printer is in the peel mode.

5. The printer of claim 1, wherein when the second tear bar is in the first position, the second tear bar is configured to extend towards a first path defined by the media to be discharged from the printer, and wherein when the second tear bar is in the second position, the second tear bar is configured to extend away from the first path.

6. The printer of claim 1, wherein the second tear bar is configured to rotate from the first position to the second position.

7. A printer comprising:

a presenter bar;

a first tear bar positioned proximate to the presenter bar;

a second tear bar that is configured to move from a first position to a second position, wherein the first position is closer to the first tear bar than the second position; and a pocket, wherein the second tear bar is configured to be positioned at least partially outside of the pocket when the second tear bar is in the first position, and wherein the second tear bar is configured to be positioned completely within the pocket when the second tear bar is in the second position.

8. The printer of claim 1, wherein the second tear bar is configured to translate from the first position to the second position.

9. A method of transitioning the printer of claim 1 from a tear mode to a peel mode, the method comprising:

moving the second tear bar from the first position to the second position.

10. The method of claim 9, further comprising rotating the peel mechanism of the printer to move the second tear bar from the first position to the second position.

11. The method of claim 9, wherein moving the second tear bar comprises rotating the second tear bar.

12. The method of claim 9, further comprising rotating a knob of the printer to move the second tear bar from the first position to the second position.

13. The method of claim 9, wherein moving the second tear bar comprises translating the second tear bar.

14. The method of claim 9, further comprising moving a switch of the printer to move the second tear bar from the first position to the second position.

15. The method of claim 9, further comprising moving the second tear bar from being positioned at least partially outside of a pocket of the printer to being positioned completely within the pocket.

16. A label printer configured to print one or more labels that each include a backing that a face of the label is adhered to, wherein the label printer is configured to operate in a tear mode and in a peel mode, wherein the label printer comprises:

a peel mechanism configured to peel the backing from the face of the one or more labels when the label printer is in the peel mode;

a first tear bar positioned proximate to the peel mechanism configured to tear the one or more labels; and a second tear bar that is configured to tear the one or more labels when the label printer is in the tear mode, wherein the second tear bar coupled to the peel mechanism, wherein a movement of the peel mechanism causes the second tear bar to move from a first position to a second position, wherein the first position is closer to the first tear bar than the second position, and wherein the second tear bar is configured to tear the one or more labels in the first position along with the first tear bar and the peel mechanism is configured to peel the one or more labels when the second tear bar is in the second position, wherein when the second tear bar is in the first position, the label printer is in the tear mode, and when the second tear bar is in the second position, the label printer is in the peel mode, wherein the second tear bar is positioned proximal to the first tear bar when the second tear bar is in the first position, and wherein the second tear bar is distal from the first tear bar when the second tear bar is in the second position.

17. The label printer of claim 16, wherein the second tear bar is configured to rotate from the first position to the second position.

18. The label printer of claim 16, wherein the second tear bar is configured to translate from the first position to the second position.

19. The label printer of claim 16, wherein the first tear bar and the second tear bar comprise an edge that is configured to tear the one or more labels.

20. The label printer of claim 16, wherein when the second tear bar is in the first position, the second tear bar is configured to extend towards a first path defined by the one or more labels to be discharged from the label printer, and wherein when the second tear bar is in the second position, the second tear bar is configured to extend away from the first path.

* * * * *